(12) United States Patent
Ganzel

(10) Patent No.: US 11,691,600 B2
(45) Date of Patent: Jul. 4, 2023

(54) VEHICLE BRAKE SYSTEM HAVING A BRAKE PEDAL UNIT

(71) Applicant: ZF ACTIVE SAFEY US INC., Livonia, MI (US)

(72) Inventor: Blaise J. Ganzel, Livonia, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 251 days.

(21) Appl. No.: 16/766,783

(22) PCT Filed: Nov. 30, 2018

(86) PCT No.: PCT/US2018/063298
§ 371 (c)(1),
(2) Date: May 26, 2020

(87) PCT Pub. No.: WO2019/108927
PCT Pub. Date: Jun. 6, 2019

(65) Prior Publication Data
US 2020/0298807 A1 Sep. 24, 2020

Related U.S. Application Data

(60) Provisional application No. 62/592,929, filed on Nov. 30, 2017.

(51) Int. Cl.
*B60T 7/04* (2006.01)
*B60T 8/40* (2006.01)
(Continued)

(52) U.S. Cl.
CPC ............ *B60T 7/042* (2013.01); *B60T 8/4081* (2013.01); *B60T 11/236* (2013.01); *B60T 13/12* (2013.01);
(Continued)

(58) Field of Classification Search
CPC ...... B60T 11/20; B60T 13/588; B60T 13/686; B60T 13/62; B60T 13/745; B60T 11/236;
(Continued)

(56) References Cited

U.S. PATENT DOCUMENTS 3,216,198 A * 11/1965 Brooks .................... B60T 11/26
220/666
4,475,338 A * 10/1984 Gaiser ..................... B60T 11/20
60/581

(Continued)

*Primary Examiner* — Nicholas J Lane
*Assistant Examiner* — San M Aung
(74) *Attorney, Agent, or Firm* — Tarolli, Sundheim, Covell & Tummino L.L.P.

(57) ABSTRACT

A brake pedal unit includes a housing defining a bore formed therein. An input piston is slidably disposed in the bore. The input piston is connected to a brake pedal such that engagement of the brake pedal causes movement of the input piston within the bore of the housing of the brake pedal unit. The brake pedal unit is defined to be in an at rest position when the brake pedal in not engaged causing movement of the input piston. A primary piston is slidably disposed in the bore for pressurizing a primary chamber. A primary passageway permits fluid communication between the primary chamber and the reservoir, wherein fluid flow through the primary passageway is blocked when the brake pedal unit is in the rest position. A secondary piston is slidably disposed in the bore for pressurizing a secondary chamber. A secondary passageway permits fluid communication between the secondary chamber and the reservoir, wherein fluid flow through the secondary passageway is blocked when the brake pedal unit is in the rest position.

30 Claims, 5 Drawing Sheets

(51) Int. Cl.
*B60T 11/236* (2006.01)
*B60T 13/12* (2006.01)
*B60T 13/62* (2006.01)
*B60T 11/16* (2006.01)
*B60T 13/14* (2006.01)
*B60T 13/68* (2006.01)

(52) U.S. Cl.
CPC ............... *B60T 13/62* (2013.01); *B60T 11/16* (2013.01); *B60T 13/145* (2013.01); *B60T 13/686* (2013.01); *B60T 2270/82* (2013.01)

(58) Field of Classification Search
CPC ...... B60T 11/228; B60T 11/26; B60T 8/4081; B60T 8/4086
USPC .......................................................... 303/14
See application file for complete search history.

(56) References Cited

U.S. PATENT DOCUMENTS

| | | | | |
|---|---|---|---|---|
| 4,514,982 | A * | 5/1985 | Bach | B60T 11/20 60/562 |
| 5,647,212 | A * | 7/1997 | Coleman | B60T 11/22 60/584 |
| 8,366,205 | B1 | 2/2013 | Mackiewicz et al. | |
| 9,321,444 | B2 * | 4/2016 | Ganzel | B60T 7/042 |
| 2009/0288412 | A1 | 11/2009 | Bernadat et al. | |
| 2014/0053546 | A1 | 2/2014 | Charpentier et al. | |
| 2014/0265544 | A1 * | 9/2014 | Ganzel | B60T 13/662 303/6.01 |
| 2015/0021977 | A1 * | 1/2015 | Miwa | B60T 7/042 303/15 |
| 2015/0097418 | A1 * | 4/2015 | Koo | B60T 11/20 303/14 |

* cited by examiner

VEHICLE BRAKE SYSTEM HAVING A BRAKE PEDAL UNIT

CROSS-REFERENCE TO RELATED APPLICATIONS

This application corresponds to PCT/US2018/063298, filed Nov. 30, 2018, which claims the benefit of U.S. Provisional Application No. 62/592,929, filed Nov. 30, 2017, the disclosures of which are incorporated herein by reference in their entireties.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal. Advanced autonomous braking systems are configured to operate the vehicle without any driver input and rely solely on the various sensors and systems that monitor the traffic conditions surrounding the vehicle.

There is illustrated in FIG. 1 a schematic illustration of a prior art master cylinder or a brake pedal unit, indicated generally at 10. The brake pedal unit 10 is an example of a prior art brake pedal unit used in the brake systems described above. The brake pedal unit 10 includes a housing with a multi-stepped bore 12 formed therein. An input piston 14, a primary piston 16, and a secondary piston 18 are slidably disposed within the bore 12. The input piston 14 is connected with a brake pedal (not shown) via a linkage arm 20. Leftward movement of the input piston 14, the primary piston 16, and the secondary piston 18 may cause, under certain conditions, a pressure increase within an input chamber 24, a primary chamber 26, and a secondary chamber 28, respectively. Various seals of the brake pedal unit 10 as well as the structure of the housing and the pistons 14, 16, and 18 define the chambers 24, 26, and 28. For example, the input chamber 24 is generally defined between the input piston 14 and the primary piston 16. The primary chamber 26 is generally defined between the primary piston 16 and the secondary piston 18. The secondary chamber 28 is generally defined between the secondary piston 18 and an end wall 30 of the housing formed by the bore 12.

The input chamber 24 is selectively in fluid communication with a pedal simulator (not shown) for simulating a force feedback on the brake pedal to the driver of the vehicle. An outer cylindrical wall of the input piston 14 is engaged with a lip seal 32 and a pair of seals 34 and 36. The seal 36 functions as a secondary sealing structure in conjunction with the seal 34 and provides an extra layer of leak protection so that fluid does not leak from the input chamber 24 out of the brake pedal unit 10. A fluid passageway 38 (or multiple passageways) is formed through a wall of the input piston 14. As shown in FIG. 1, when the brake pedal unit 10 is in its rest position (the driver is not depressing the brake pedal), the passageway 38 is located between the lip seal 32 and the seal 36. In the rest position, the passageway 38 permits fluid communication between the input chamber 24 and a fluid reservoir (not shown). Note that in the rest position of the brake pedal unit 10, the lip seal 32 is to the left of the passageway 38, thereby permitting fluid communication between the input chamber 24 and the fluid reservoir. During initial operation of the brake pedal unit 10, sufficient leftward movement of the input piston 14, as viewing FIG. 1, will cause the passageway 38 to move past the lip seal 32, thereby preventing the flow of fluid from the input chamber 24 into the reservoir. Further leftward movement of the input piston 14 will pressurize the input chamber 24 causing fluid to flow into the pedal simulator.

Under certain conditions, the primary and secondary chambers 26 and 28 are each in fluid communication with of a pair of wheel brakes (not shown) which provide pressurized fluid to the wheel brakes when a buildup of pressure occurs within the first and second pressure chambers 26 and 28. An outer wall of the primary piston 16 is engaged with a lip seal 40 and a seal 42 mounted in grooves formed in the housing. A fluid passageway 44 (or passageways) is formed through a wall of the primary piston 16. The passageway 44 is located between the lip seal 40 and the seal 42 when the primary piston 16 is in its rest position. Note that in the rest position of the brake pedal unit 10, the lip seal 40 is to the left of the passageway 44, thereby permitting fluid communication between the primary chamber 26 and the reservoir. An outer wall of the secondary piston 18 is engaged with a lip seal 46 and a seal 48 mounted in grooves formed in the housing. A fluid passageway 50 (or passageways) is formed through a wall of the secondary piston 18. The passageway 50 is located between the lip seal 46 and the seal 48 when the secondary piston 18 is in its rest position. Note that in the rest position of the brake pedal unit 10, the lip seal 50 is to the left of the passageway 50, thereby permitting fluid communication between the secondary chamber 28 and the fluid reservoir.

The brake pedal unit 10 includes an input spring assembly 52 generally disposed between the input piston 14 and the primary piston 16. A primary spring assembly 54 is disposed between the primary piston 16 and the secondary piston 18. A secondary spring assembly 56 is disposed between the secondary piston 18 and a bottom wall of the housing. The input, primary and secondary spring assemblies 52, 54, and 56 function as caged spring assemblies for biasing the pistons 14, 16, and 18 away from each other as well as functioning to properly position the pistons 14, 16, and 18 within the housing of the brake pedal unit 10. A caged spring assembly includes structures which limit and define the length of the caged spring assembly, thereby positioning the pistons at a predefined distance relative to one another. A spring preload may exist in the spring members of the caged spring assembly such that an initial force is required to compress the spring members of the caged spring assembly. The brake pedal unit 10 further includes a return spring 58 biasing the input piston 14 in the rightward direction as viewing FIG. 1. Note that in the rest position of the brake pedal unit 10, the caged secondary spring assembly 56 is provided with a gap 90 between an enlarged head portion 62 of a stem 64 and a retainer 66.

In the rest position of the brake pedal unit 10, all three chambers 24, 26, and 28 are in fluid communication with the fluid reservoir via the respective passageways 38, 44, and 50. During operation of the brake pedal unit 10, the driver depresses the brake pedal causing leftward movement of the input piston 14. Fluid from the input chamber 24 is vented to the fluid reservoir until the passageway 38 slips past the lip seal 32. Further leftward movement of the input piston 14 causes an increase in pressure within the input pressure chamber 24 causing actuation of the pedal simulator. Note that upon movement of the input piston 14, there is a simultaneous cut-off of fluid to the reservoir from all three pressure chambers 24, 26, and 28 due to the respective passageways 38, 44, and 50 slipping past the respective lip seals 32, 40, and 46. Under normal braking conditions, the pressure from the primary and secondary chambers 26 and 28 is prevented from any fluid flow to the wheel brakes, thereby hydraulically locking the primary and secondary chambers 26 and 28 and preventing further movement of the primary and secondary pistons 16 and 18. Instead, another source of pressurized fluid is utilized to provide controlled fluid pressure to actuate the wheel brakes. However, under certain failed conditions of the brake system, the brake pedal unit 10 could be used to provide pressurized fluid to the wheel brakes by permitting fluid from the primary and secondary chambers 26 and 28 to be directed to the wheel brakes.

Although the design of the brake pedal unit 10 functions adequately, there is a relatively high initial force required by the driver to actuate the brake pedal unit. The forces from the spring arrangements and seal friction much first be overcome. This may impart an undesirable pedal feel characteristic for the driver. Although the brake pedal unit 10 may be suitable for a truck or larger vehicle, it may not be desirable for a smaller passenger vehicle.

SUMMARY OF THE INVENTION

This invention relates to a master cylinder or brake pedal unit which is connected to a brake pedal and is in selective fluid communication with a fluid reservoir. The pedal unit includes a housing defining a bore formed therein. An input piston is slidably disposed in the bore. The input piston is connected to the brake pedal such that engagement of the brake pedal causes movement of the input piston within the bore of the housing of the brake pedal unit. The brake pedal unit is defined to be in an at rest position when the brake pedal in not engaged causing movement of the input piston. A primary piston is slidably disposed in the bore for pressurizing a primary chamber. A primary passageway permits fluid communication between the primary chamber and the reservoir, wherein fluid flow through the primary passageway is blocked when the brake pedal unit is in the rest position. A secondary piston is slidably disposed in the bore for pressurizing a secondary chamber. A secondary passageway permits fluid communication between the secondary chamber and the reservoir, wherein fluid flow through the secondary passageway is blocked when the brake pedal unit is in the rest position.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 2:
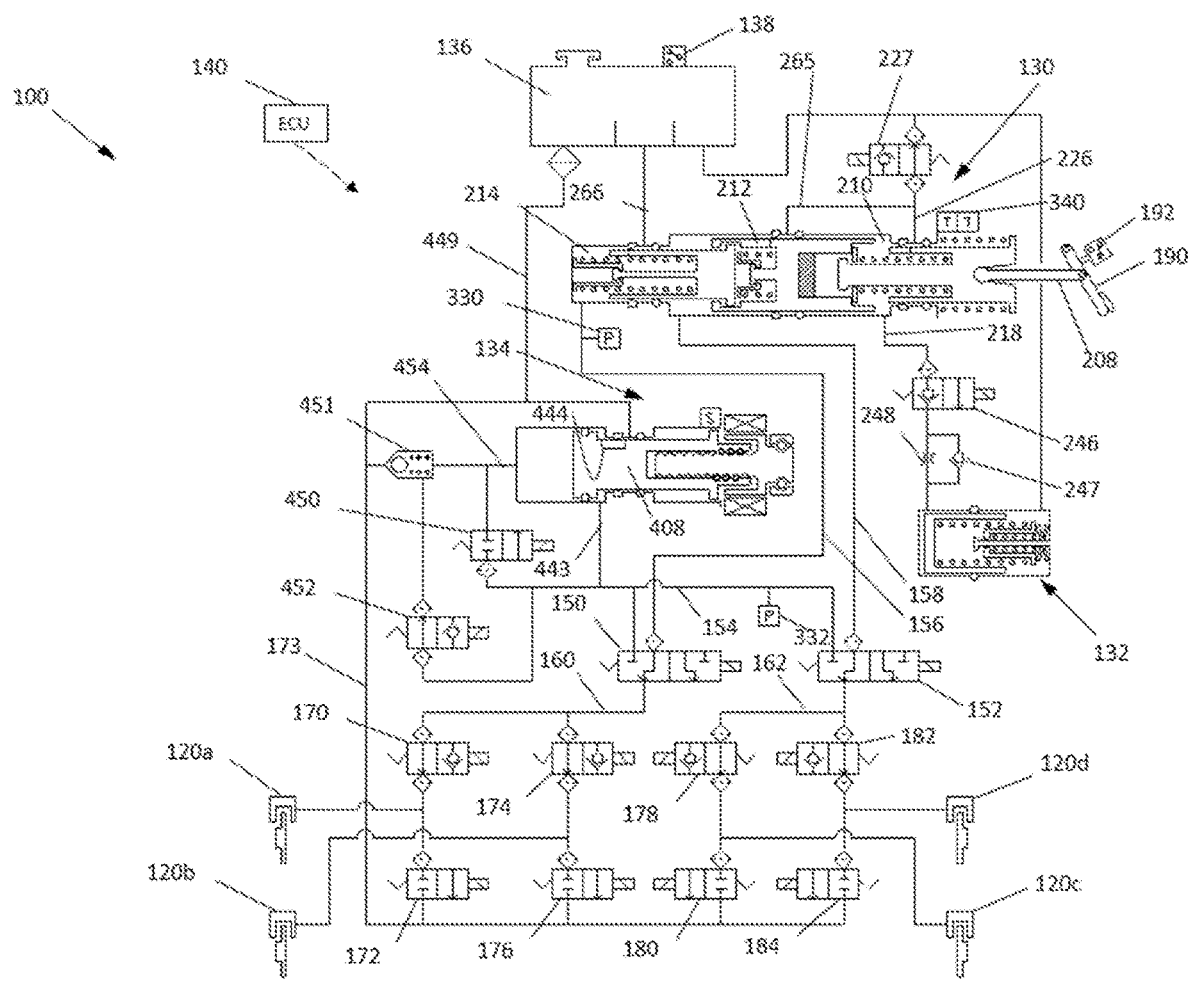
FIG. 2 is a schematic illustration of an embodiment of a brake system in accordance with the present invention.

Referring now to the drawings, there is schematically illustrated in FIG. 2 an embodiment of a vehicle brake system, indicated generally at 100. The brake system 100 is a hydraulic boost braking system in which boosted fluid pressure is utilized to apply braking forces for the brake system 100. The brake system 100 may suitably be used on a ground vehicle such as an automotive vehicle having four wheels with a wheel brake associated with each wheel. Furthermore, the brake system 100 can be provided with other braking functions such as anti-lock braking (ABS) and other slip control features to effectively brake the vehicle, as will be discussed below. Components of the brake system 100 may be housed in one or more blocks or housings. The block or housing may be made from solid material, such as aluminum, that has been drilled, machined, or otherwise formed to house the various components. Fluid conduits may also be formed in the block or housing In the illustrated embodiment of the brake system 100, there are four wheel brakes 120a, 120b, 120c, and 120d. The wheel brakes 120a, 120b, 120c, and 120d can have any suitable wheel brake structure operated by the application of pressurized brake fluid. The wheel brakes 120a, 120b, 120c, and 120d may include, for example, a brake caliper mounted on the vehicle to engage a frictional element (such as a brake disc) that rotates with a vehicle wheel to effect braking of the associated vehicle wheel. The wheel brakes 120a, 120b, 120c, and 120d can be associated with any combination of front and rear wheels of the vehicle in which the brake system 100 is installed. For example, the brake system 100 may be configured as a vertical split system such that a front pressure circuit is associated with providing fluid to the wheel brakes 120a and 120b, and a rear pressure circuit is associated with providing fluid to the wheel brakes 120c and 120d. In this example, the wheel brake 120a may be associated with a left front wheel of the vehicle in which the brake system 100 is installed, and the wheel brake 120b may be associated with the right front wheel. The wheel brake 120c may be associated with the left rear wheel, and the wheel brake 120d may be associated with the right rear wheel. Alternatively, the brake system 10 may be configured as a diagonally split brake system such that the wheel brakes 120a and 120d are associated with wheels at opposite corners of the vehicle, and the wheel brakes 120b and 12c are associated with the other opposite corners of the vehicle.

The brake system 100 generally includes a brake pedal unit, indicated generally at 130, a pedal simulator, indicated generally at 132, a plunger assembly, indicated generally at 134, and a fluid reservoir 136. The reservoir 136 stores and holds hydraulic fluid for the brake system 100. The fluid within the reservoir 136 is preferably held at or about atmospheric pressure but may store the fluid at other pressures if so desired. The reservoir 136 is shown schematically having three tanks or sections with three fluid conduit lines connected thereto. The sections can be separated by several interior walls within the reservoir 136 and are provided to prevent complete drainage of the reservoir 136 in case one of the sections is depleted due to a leakage via one of the three lines connected to the reservoir 136. Alternatively, the reservoir 136 may include multiple separate housings. The reservoir 136 may include a fluid level sensor 138 for detecting the fluid level of one or more of the sections of the reservoir 136.

As will be discussed in more detail below, the plunger assembly 134 of the brake system 100 functions as a source of pressure to provide a desired pressure level to the wheel brakes 120a, 120b, 120c, and 120d during a typical or normal brake apply. After a brake apply, fluid from the wheel brakes 120a, 120b, 120c, and 120d may be returned to the plunger assembly 134 and/or diverted to the reservoir 136. In a preferred embodiment, the plunger assembly 134 is a dual acting plunger assembly such that it is configured to also provide boosted pressure to the brake system 100 when a piston of the plunger assembly 134 is stroked rearwardly as well as forwardly, as will be described in more detail below.

The brake system 100 further includes an electronic control unit or ECU 140. The ECU 140 may include microprocessors and other electrical circuitry. The ECU 140 receives various signals, processes signals, and controls the operation of various electrical components of the brake system 100 in response to the received signals. The ECU 140 can be connected to various sensors such as the reservoir fluid level sensor 138, pressure sensors, travel sensors, switches, wheel speed sensors, and steering angle sensors. The ECU 140 may also be connected to an external module (not shown) for receiving information related to yaw rate, lateral acceleration, longitudinal acceleration of the vehicle such as for controlling the brake system 100 during vehicle stability operation. Additionally, the ECU 140 may be connected to the instrument cluster for collecting and supplying information related to warning indicators such as an ABS warning light, a brake fluid level warning light, and a traction control/vehicle stability control indicator light.

The brake system 100 further includes first and second isolation valves 150 and 152. The isolation valves 150 and 152 may be solenoid actuated three way valves. The isolation valves 150 and 152 are generally operable to two positions, as schematically shown in FIG. 2. The first and second isolation valves 150 and 152 each have a port in selective fluid communication with an output conduit 154 generally in communication with the output of the plunger assembly 134, as will be discussed below. The first and second isolation valves 150 and 152 also includes ports that are in fluid communication with conduits 156 and 158, respectively, which are connected to the brake pedal unit 130 when the first and second isolation valves 150 and 152 are de-energized, as shown in FIG. 2. The first and second isolation valves 150 and 152 further include ports that are in fluid communication with conduits 160 and 162, respectively, which provide fluid to and from the wheel brakes 120a, 120b, 120c, and 120d.

In a preferred embodiment, the first and/or second isolation valves 150 and 152 may be mechanically designed such that flow is permitted to flow in the reverse direction (from the output conduit 154 to the conduits 156 and 158, respectively) when in their de-energized positions and can bypass the normally closed seat of the valves 150 and 152. Thus, although the 3-way valves 150 and 152 are not shown schematically to indicate this fluid flow position, it is noted that that the valve design may permit such fluid flow. This may be helpful in performing self-diagnostic tests of the brake system 100.

The system 100 further includes various solenoid actuated valves (slip control valve arrangement) for permitting controlled braking operations, such as ABS, traction control, vehicle stability control, dynamic rear proportioning, regenerative braking blending, and autonomous braking. A first set of valves includes a first apply valve 170 and a first dump valve 172 in fluid communication with the conduit 160 for cooperatively supplying fluid received from the first isolation valve 150 to the front wheel brake 120a, and for cooperatively relieving pressurized fluid from the wheel brake 120a to a reservoir conduit 173 in fluid communication with the reservoir 136. A second set of valves includes a second apply valve 174 and a second dump valve 176 in fluid communication with the conduit 160 for cooperatively supplying fluid received from the first isolation valve 150 to the wheel brake 120b, and for cooperatively relieving pressurized fluid from the wheel brake 120b to the reservoir conduit 173. A third set of valves includes a third apply valve 178 and a third dump valve 180 in fluid communication with the conduit 162 for cooperatively supplying fluid received from the second isolation valve 152 to the wheel brake 120c, and for cooperatively relieving pressurized fluid from the wheel brake 120c to the reservoir conduit 173. A fourth set of valves includes a fourth apply valve 182 and a fourth dump valve 184 in fluid communication with the conduit 162 for cooperatively supplying fluid received from the second isolation valve 152 to the wheel brake 120d, and for cooperatively relieving pressurized fluid from the wheel brake 120d to the reservoir conduit 173. Note that in a normal braking event, fluid flows through the de-energized open apply valves 170, 174, 178, and 182. Additionally, the dump valves 172, 176, 180, and 184 are preferably in their de-energized closed positions to prevent the flow of fluid to the reservoir 136.

The brake pedal unit 130 is connected to a brake pedal 190 and is actuated by the driver of the vehicle as the driver presses on the brake pedal 190. A brake sensor or switch 192 may be connected to the ECU 140 to provide a signal indicating a depression of the brake pedal 190. As will be discussed below, the brake pedal unit 130 may be used as a back-up source of pressurized fluid to essentially replace the normally supplied source of pressurized fluid from the plunger assembly 134 under certain failed conditions of the brake system 100. This situation is referred to as a manual push-through event. The brake pedal unit 130 can supply pressurized fluid to the conduits 156 and 158 (that are normally closed off at the first and second isolation valves 150 and 152 during a normal brake apply) to the wheel brake 120a, 120b, 120c, and 120d as required.

Figure 3:
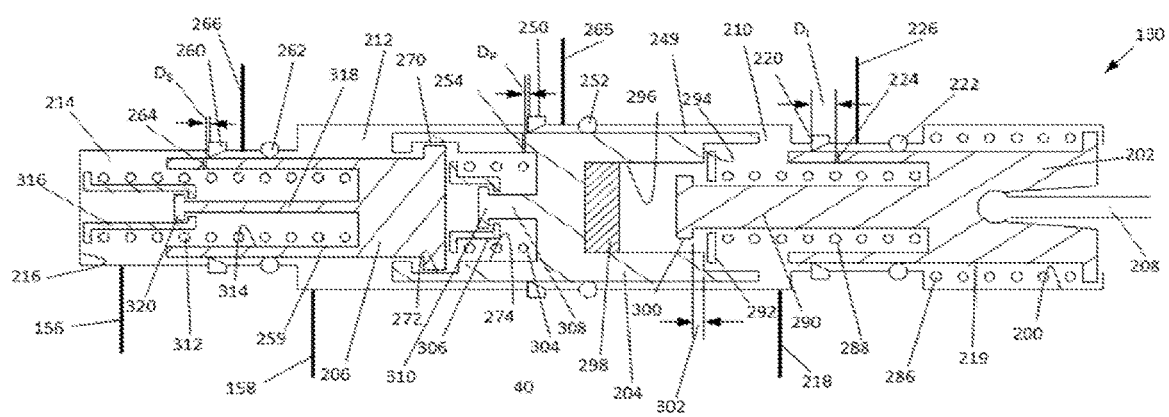
FIG. 3 is a schematic cross-sectional illustration of the brake pedal unit of the brake system of FIG. 2.

As shown schematically in FIG. 3, the brake pedal unit 130 includes a housing having a multi-stepped bore 200 formed therein for slidably receiving various cylindrical pistons and other components therein. Note that the housing is not specifically schematically shown in FIG. 3 but instead the walls of the bore 200 are illustrated. The housing may be formed as a single unit or include two or more separately formed portions coupled together. An input piston 202, a primary piston 204, and a secondary piston 206 are slidably disposed within the bore 200. The input piston 202 is connected with the brake pedal 190 via a linkage arm 208. Leftward movement of the input piston 202, the primary piston 204, and the secondary piston 206 may cause, under certain conditions, a pressure increase within an input chamber 210, a primary chamber 212, and a secondary chamber 214, respectively. Various seals of the brake pedal unit 130 as well as the structure of the housing and the pistons 202, 204, and 206 define the chambers 210, 212, and 214, respectively. For example, the input chamber 210 is generally defined between the input piston 202 and the primary piston 204. The primary chamber 212 is generally defined between the primary piston 204 and the secondary piston 206. The secondary chamber 214 is generally defined between the secondary piston 206 and an end wall 216 of the housing formed by the bore 200. The primary and secondary pistons 204 and 206 define a pair of output pistons for the brake pedal unit 130. The primary and secondary chambers 212 and 214 define a pair of outputs of the brake pedal unit 130.

The input chamber 210 is in fluid communication with the pedal simulator 132 via a conduit 218, the reason for which will be explained below. The input piston 202 is slidably disposed in the bore 200 of the housing of the brake pedal unit 130. An outer cylindrical wall 219 of the input piston 202 is engaged with a lip seal 220 and a seal 222 mounted in grooves formed in the housing. A fluid passageway 224 (or multiple passageways) is formed through a wall of the input piston 202. As shown in FIGS. 2 and 3, when the brake pedal unit 130 is in its rest position (the driver is not depressing the brake pedal 190), the passageway 224 is located between the lip seal 220 and the seal 222. In the rest position, the passageway 224 permits fluid communication between the input chamber 210 and the reservoir 136 via a conduit 226.

Referring back to FIG. 1, the brake system 100 may further include an optional solenoid actuated simulator test valve 227 which may be electronically controlled between an open position, as shown in FIG. 2, and a powered closed position. The simulator test valve 227 is not necessarily needed during a normal brake apply or for a manual push through mode. The simulator test valve 227 can be actuated to a closed position during various testing modes to determine the correct operation of other components of the brake system 100. For example, the simulator test valve 227 may be actuated to a closed position to prevent venting to the reservoir 136 via the conduit 226 such that a pressure build up in the brake pedal unit 130 can be used to monitor fluid flow to determine whether leaks may be occurring through seals of various components of the brake system 100.

During initial operation of the brake pedal unit 130, sufficient leftward movement of the input piston 202, as viewing FIG. 3, will cause the passageway 224 to move past the lip seal 220, thereby preventing the flow of fluid from the input chamber 210 into the conduit 226 and into the reservoir 136. Further leftward movement of the input piston 202 will pressurize the input chamber 210 causing fluid to flow into the pedal simulator 132 via the conduit 218. As fluid is diverted into the pedal simulator 132, the pedal simulator 132 is actuated to provide a feedback force to the driver of the vehicle via the brake pedal 190 which simulates the forces a driver feels at the brake pedal 190 in a conventional vacuum assist hydraulic brake system, for example.

Figure 4:
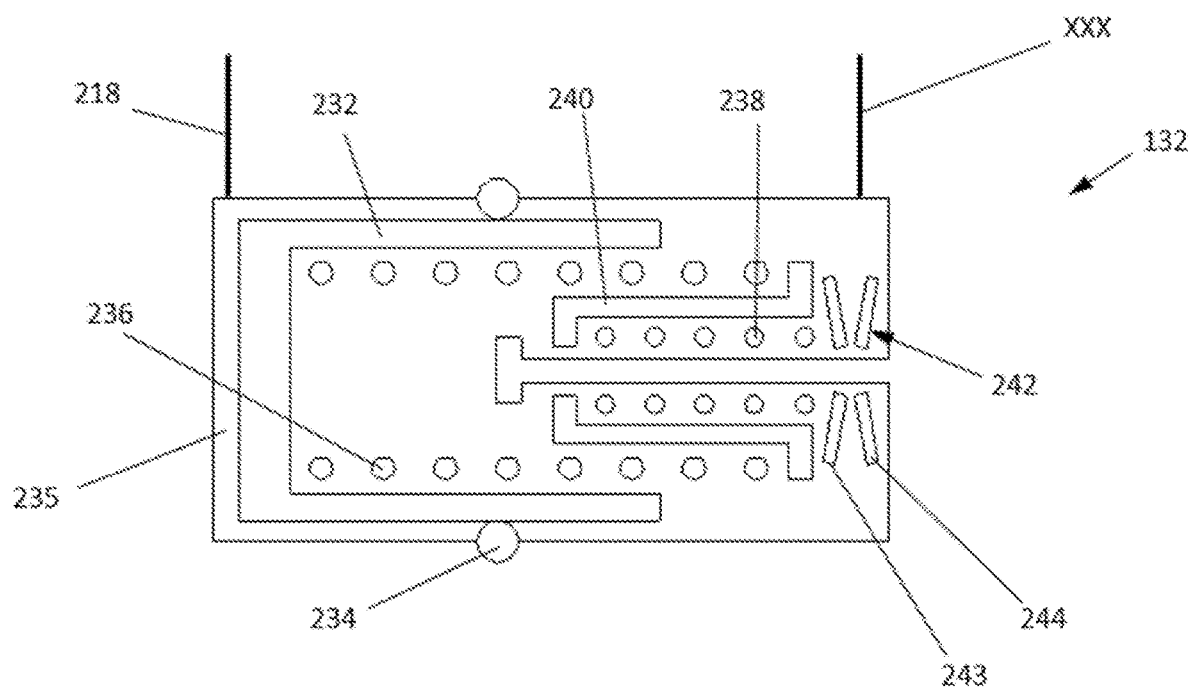
FIG. 4 is a schematic cross-sectional illustration of the pedal simulator of the brake system of FIG. 2.

Referring now to FIG. 4, the embodiment of the pedal simulator 132 includes a housing defining a bore 230. A cup-shaped piston 232 is slidably disposed in the bore 230. The piston 232 is sealingly engaged with the wall of the bore 230 by a seal 234. A pressure chamber 235 is defined by the bore 230 and the piston 232. The pressure chamber 235 is in fluid communication with the input chamber 210 of the brake pedal unit 130 via the conduit 218. The pedal simulator 132 may include a first spring 236 and a second spring 238 having a relatively low spring rate compared to the first spring 236. In the example shown, the second spring 238 has a preload value of about 3 N. A tubular retainer 240 is disposed between the first and second springs 236 and 238 such that the first and second springs act against one another via the retainer 240. The pedal simulator 132 may further include a spring washer assembly 242. The spring washer assembly 242 may include one or more conical washer springs having a relatively high spring rate. Of course, the spring washer assembly 242 may include any suitable type of spring designs such as wave springs, Belleville washers, or elastomeric pad(s). In the embodiment shown, the spring washer assembly 242 includes a pair of conical washers 243 and 244. After sufficient compression of the first spring 236 and the retainer 240 has moved a sufficient distance to close the gap, the right hand end of the retainer 240 will start compressing the conical spring washer assembly 242 along with the compression of the spring 236 and 238. This arrangement assists in causing a non-linear progressive spring rate characteristic for obtaining a desirable force feedback to the driver.

As discussed above, the simulation pressure chamber 235 of the pedal simulator 132 is in fluid communication with the conduit 218 which is in fluid communication with the input chamber 210 of the brake pedal unit 130. As shown in FIG. 2, a solenoid actuated simulator valve 246 is positioned within the conduit 218 to selectively prevent the flow of fluid from the input chamber 210 to the simulation pressure chamber 235, such as during a failed condition in which the brake pedal unit 130 is utilized to provide a source of pressurized fluid to the wheel brakes 120a, 120b, 120c, and 120d.

The brake system 100 may further include a check valve 247 which is in a parallel path arrangement with a restricted orifice 248 in the conduit 118. The check valve 247 and the restricted orifice 248 could be integrally built or formed in the simulator valve 246 or may be formed separately therefrom. The restricted orifice 248 provides damping during a spike apply in which the driver depresses the brake pedal 190 rapidly and forcefully. This damping provides a force feedback making depression of the brake pedal 190 feel more like a traditional vacuum booster, which may be a desirable characteristic of the brake system 100. The damping may also provide a more accurate relationship between brake pedal travel and vehicle deceleration by generally avoiding too much brake pedal travel for the vehicle deceleration that can be delivered by the brake system 100. The check valve 247 provides an easy flow path and allows the brake pedal 190 to return quickly, which allows the associated brake pressure to decrease quickly per the driver's intent.

The primary chamber 212 of the brake pedal unit 130 is in fluid communication with the second isolation valve 152 via the conduit 158. The primary piston 204 is slidably disposed in the bore 200 of the housing of the brake pedal unit 130. An outer wall 249 of the primary piston 104 is engaged with a lip seal 250 (primary seal) and a seal 252 mounted in grooves formed in the housing. One or more passageway(s) 254 are formed through a wall of the primary piston 204. Unlike the arrangement of the input piston 202, when the brake pedal unit 130 is in its rest position (driver is not pressing on the brake pedal 190), the passageway 254 is just to the left of the lip seal 250. As shown in FIG. 3, the passageway 254 is spaced from the lip seal 250 by about a relatively small distance Dp. This position prevents the fluid communication between primary chamber 212 and the reservoir 136 via the conduit 265. Note with respect to the input piston 202, the passageway 224 is spaced from the lip seal 220 by a slightly larger distance $D_I$. It is noted that the schematic illustrations of FIG. 3 are not to scale and the dimensions are shown for ease of explanation.

The secondary chamber 214 of the brake pedal unit 130 is in fluid communication with the first isolation valve 150 via the conduit 156. Referring now to FIG. 3, the secondary piston 206 is slidably disposed in the bore 200 of the housing of the brake pedal unit 130. An outer wall 259 of the secondary piston 206 is engaged with a lip seal 260 (secondary seal) and a seal 262 mounted in grooves formed in the housing. One or more passageway(s) 264 are formed through a wall of the secondary piston 206. Similar to the arrangement of the primary piston 204, when the brake pedal unit 130 is in its rest position (driver is not pressing on the brake pedal 190), the passageway 264 is just to the left of the lip seal 260. As shown in FIG. 3, the passageway 264 is spaced from the lip seal 260 by about a relatively small width $D_S$. This position prevents the fluid communication between secondary chamber 214 and the reservoir 136 via the conduit 266.

The lip seals 220, 250 and 260 may have any suitable seal structure. The lip seals 250 and 260 may be designed such that fluid may flow in the direction from the reservoir 136 into the primary and secondary chambers 212 and 214 via the conduits 265 and 266, respectively, when the pressure within the chambers 212 and 214 falls below atmospheric pressure (the pressure within the reservoir 136). This may be true even if the brake pedal unit 130 is in its rest position. This may be caused by minor leakage or fluid volume changes in the wheel brakes.

In an alternate embodiment, lip seals similar to the lip seals 220, 250 and/or 260 may be mounted on the pistons 202, 204, and/or 206, respectively. Passageways similar to the passageways 224, 254, and 264 would then be formed in the housing of the brake pedal unit and in fluid communication with the reservoir 136.

If desired, the primary and secondary pistons 204 and 206 may be mechanically connected but with limited movement therebetween. The mechanical connection of the primary and secondary pistons 204 and 206 prevents a large gap or distance between the primary and secondary pistons 204 and 206. This helps prevent lost pedal travel by preventing having to advance the primary and secondary pistons 204 and 206 over a relatively large distance without any increase in pressure during a failed system event. For example, if the brake system 100 is under a manual push-through mode and fluid pressure is lost in the front circuit relative to the secondary piston 206 (secondary chamber 214), such as for example in the conduit 156, the secondary piston 206 will be forced or biased in the leftward direction due to the greater pressure within the primary chamber 212. If the primary and secondary pistons 204 and 206 were not connected together, the secondary piston 206 would freely travel to its further most left-hand position, as viewing FIG. 3, and the driver would have to depress the pedal 190 a distance to compensate for this loss in travel. However, because the primary and secondary pistons 204 and 206 are connected together, the secondary piston 206 is prevented from this movement and relatively little loss of travel occurs in this type of failure.

Any suitable mechanical connection between the primary and secondary pistons 204 and 206 may be used. For example, as schematically shown in FIG. 3, the right-hand end of the secondary piston 206 includes an outwardly extending flange 270 that extends into a groove 272 formed in an inner wall 274 of the primary piston 204. The groove 272 has a width which is greater than the width of the flange 270, thereby providing a relatively small amount of travel between the primary and secondary pistons 204 and 206 relative to one another.

The brake pedal unit 130 further includes a return spring 286 biasing the input piston 202 in the rightward direction as viewing FIG. 3. An input spring 288 is disposed about an axial stem 290 formed in the input piston 202 and engages with a washer 292 which is in direct contact with a shoulder 294 formed in the right-hand end of the primary piston 212. The axial stem 290 extends into a bore 296 formed in the right-hand end of the primary piston 212. An elastomeric pad 298 is disposed in the bore 296 and will engage with an enlarged head 300 formed at the end of the axial stem 290 when the input piston 210 is moved a sufficient distance towards the primary piston 212. Compression of the elastomeric pad 298 by the head 300 of the stem 290 provides for a desired spring rate characteristic. The enlarged head 300 is spaced from the washer 292 and the shoulder 294 by a gap 302. Note that the washer 292 actually engages with and touches the shoulder 294, and not spaced therefrom as shown in the schematic illustration of FIG. 3. The very slight gap schematically shown between the washer 292 and the shoulder 294 is shown for clarity purposes such that the lines are not drawn on top of one another. This schematic illustration is true of other components of the brake pedal unit 130 that are actually in contact with one another yet shown just slightly out of contact with one another.

The brake pedal unit 2702 further includes a primary spring 304 generally disposed between the secondary piston 206 and the primary piston 204. The primary spring 304 is disposed within the bore 274 and engages with a retainer 306 forming a caged spring assembly configuration with an axial stem 308 extending from bottom of the bore 274 of the primary piston 204. The retainer 306 is restrained by an enlarged head 310 formed on the end of the axial stem 308.

The brake pedal unit 2702 further includes a secondary spring 312 generally disposed between the secondary piston 206 and the bottom wall 216 of the bore 200. The secondary spring 312 is disposed within a bore 314 formed in the left-hand end of the secondary piston 206 and engages with a retainer 316 forming a caged spring assembly configuration with an axial stem 318 extending from the bottom of the bore 314 of the secondary piston 206. The retainer 316 is restrained by an enlarged head 320 formed on the end of the axial stem 318. Note that at the rest position, the enlarged head 320 contacts the end of the retainer 316 such that there is essentially no gap therebetween.

As shown in FIG. 2, the brake system 100 may further include a pressure sensor 330 in fluid communication with the conduit 156 to detect the pressure within the secondary pressure chamber 214 of the brake pedal unit 130 and for transmitting the signal indicative of the pressure to the ECU 140. The brake system 100 further includes a pressure sensor 332 in fluid communication with the output conduit 154 for transmitting a signal indicative of the pressure at the output of the plunger assembly 134. The ECU 140 utilizes the signals from the pressure sensors 330 and 332 to actuate the brake system 100 under various braking events.

In a preferred embodiment of the brake system 100, the brake pedal unit 130 includes a pair of travel sensors 340 (one redundant) for producing signals that are indicative of the length of travel and/or rate of travel of the input piston 202 and providing the signals to the ECU 140.

Figure 5:
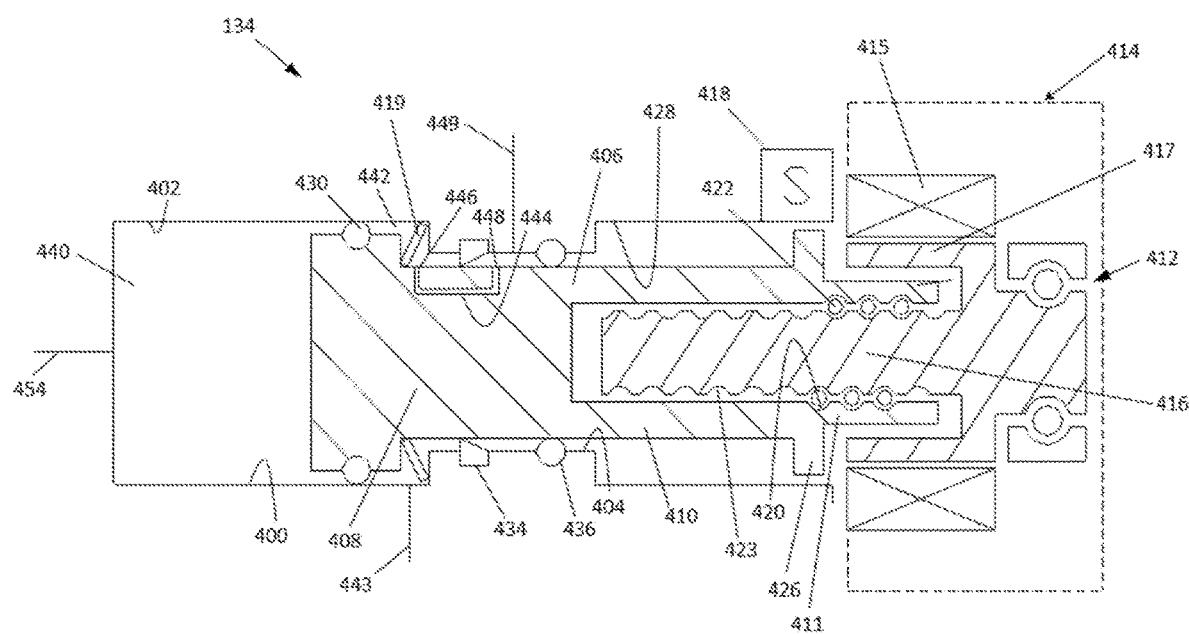
FIG. 5 is a schematic cross-sectional illustration of the plunger assembly of the brake system of FIG. 2.

Referring now to FIG. 5, there is schematically illustrated an enlarged view of the plunger assembly 134. The plunger assembly 134 includes a housing having a multi-stepped bore 400 formed therein. Note that the housing is not specifically schematically shown in FIG. 5 but instead the walls of the bore 400 are illustrated. The bore 400 includes a first portion 402 and a second portion 404. A piston 406 is slidably disposed within the bore 400. The piston 406 includes an enlarged end portion 408 connected to a smaller diameter central portion 410. The piston 406 has a second end 411 connected to a ball screw mechanism, indicated generally at 412. The ball screw mechanism 412 is provided to impart translational or linear motion of the piston 406 along an axis defined by the bore 400 in both a forward direction (leftward as viewing FIG. 5), and a rearward direction (rightward as viewing FIG. 5) within the bore 400 of the housing. In the embodiment shown, the ball screw mechanism 412 includes an electric motor, indicated schematically and generally at 414, which is electrically connected to the ECU 140 for actuation thereof. The motor 414 rotatably drives a screw shaft 416. The motor 414 generally includes a stator 415 and a rotor 417. In the schematic embodiment shown in FIG. 5, the rotor 417 and the shaft 416 are integrally formed together. The second end 411 of the piston 406 includes a threaded bore 420 and functions as a driven nut of the ball screw mechanism 412. The ball screw mechanism 412 includes a plurality of balls 422 that are retained within helical raceways 423 formed in the screw shaft 416 and the threaded bore 420 of the piston 406 to reduce friction.

Although a ball screw mechanism 412 is shown and described with respect to the plunger assembly 134, it should be understood that other suitable mechanical linear actuators may be used for imparting movement of the piston 406. It should also be understood that although the piston 406 functions as the nut of the ball screw mechanism 412, the piston 406 could be configured to function as a screw shaft of the ball screw mechanism 412. Of course, under this circumstance, the screw shaft 416 would be configured to function as a nut having internal helical raceways formed therein.

The piston 406 may include structures engaged with cooperating structures formed in the housing of the plunger assembly 134 to prevent rotation of the piston 406 as the screw shaft 416 rotates around the piston 406. For example, the piston 206 may include outwardly extending splines or tabs 426 (See FIG. 5) that are disposed within longitudinally extending grooves 428 formed in the housing of the plunger assembly 134 such that the tabs 426 slide along within the grooves 428 as the piston 406 travels in the bore 400.

As will be discussed below, the plunger assembly 134 is preferably configured to provide pressure to the output conduit 154 when the piston 406 is moved in either the forward or rearward direction. The plunger assembly 134 includes a seal 430 mounted on the enlarged end portion 408 of the piston 406. The seal 430 slidably engages with the inner cylindrical surface of the first portion 402 of the bore 400 as the piston 406 moves within the bore 400. A seal 434 and a seal 436 are mounted in grooves formed in the second portion 404 of the bore 400. The seals 434 and 436 slidably engage with the outer cylindrical surface of the central portion 410 of the piston 406. A first pressure chamber 440 is generally defined by the first portion 402 of the bore 400, the enlarged end portion 408 of the piston 406, and the seal 430. An annular shaped second pressure chamber 442, located generally behind the enlarged end portion 408 of the piston 406, is generally defined by the first and second portions 402 and 404 of the bore 400, the seals 430 and 434, and the central portion 410 of the piston 406. The seals 430, 434, and 436 may have any suitable seal structure.

Although the plunger assembly 134 may be configured to any suitable size and arrangement, in one embodiment, the effective hydraulic area of the first pressure chamber 440 is greater than the effective hydraulic area of the annular shaped second pressure chamber 442. The first pressure chamber 440 generally has an effective hydraulic area corresponding to the diameter of the central portion 410 of the piston 406 (the inner diameter of the seal 434) since fluid is diverted through the output conduit 154 and conduits 443 and 454 as the piston 406 is advanced in the forward direction. The second pressure chamber 442 generally has an effective hydraulic area corresponding to the diameter of the first portion 402 of the bore 400 minus the diameter of the central portion 410 of the piston 406. In general, if the annular area is less than the diameter of the central portion 410, this configuration provides that on the back stroke in which the piston 406 is moving rearwardly, less torque (or power) is required by the motor 414 to maintain the same pressure as in its forward stroke. Besides using less power, the motor 414 may also generate less heat during the rearward stroke of piston 406. Under circumstances when high brake pressure is desired, the plunger assembly 134 could be operated from a forward stroke to a rearward stroke. So while a forward stroke is used in most brake applications, a rearward pressure stroke can be utilized. Also, under circumstances in which the driver presses on the pedal 190 for long durations, the brake system 10 could be operated to maintain brake pressure (instead of continuously energizing the plunger assembly 134) by controlling the first and second plunger valves 450 and 452 (as will be discussed below) to closed positions and then turn off the motor or the plunger assembly 134.

The plunger assembly 134 preferably includes a sensor, schematically shown as 418, for indirectly detecting the position of the piston 406 within the bore 400. The sensor 418 is in communication with the ECU 140. In one embodiment, the sensor 418 detects the rotational position of the rotor 417 which may have metallic or magnetic elements embedded therein. Since the rotor 417 is integrally formed with the shaft 416, the rotational position of the shaft 416 corresponds to the linear position of the piston 406. Thus, the position of the piston 406 can be determined by sensing the rotational position of the rotor 417 via the sensor 418.

The piston 406 of the plunger assembly 134 includes a passageway 444 formed therein. The passageway 444 defines a first port 446 extending through the outer cylindrical wall of the piston 406 and is in fluid communication with the secondary chamber 442. The passageway 444 also defines a second port 448 extending through the outer cylindrical wall of the piston 406 and is in fluid communication with a portion of the bore 400 located between the seals 434 and 436. The second port 448 is in fluid communication with a conduit 449 which is in fluid communication with the reservoir 136. When in the rest position, as shown in FIGS. 2 and 5, the pressure chambers 440 and 442 are in fluid communication with the reservoir 136 via the conduits 449, 454 and 443. This helps in ensuring a proper release of pressure at the output of the plunger assembly 34 and within the pressure chambers 440 and 442 themselves. After an initial forward movement of the piston 406 from its rest position, the port 448 will move past the lip seal 434, thereby closing off fluid communication of the pressure chambers 440 and 442 from the reservoir 136, thereby permitting the pressure chambers 440 and 442 to build up pressure as the piston 406 moves further.

Referring back to FIG. 2, the brake system 100 further includes a first plunger valve 450, and a second plunger valve 452. The first plunger valve 450 is preferably a solenoid actuated normally closed valve. Thus, in the non-energized state, the first plunger valve 450 is in a closed position, as shown in FIG. 2. The second plunger valve 452 is preferably a solenoid actuated normally open valve. Thus, in the non-energized state, the second plunger valve 452 is in an open position, as shown in FIG. 2. A check valve may be arranged within the second plunger valve 452 so that when the second plunger valve 452 is in its closed position, fluid may still flow through the second plunger valve 452 in the direction from the first output conduit 454 (from the first pressure chamber 440 of the plunger assembly 134) to the output conduit 154 leading to the isolation valves 150 and 152. Note that during a rearward stroke of the piston 406 of the plunger assembly 134, pressure may be generated in the second pressure chamber 442 for output into the output conduit 154. The brake system 100 further includes a check valve 451 permitting fluid to flow in the direction from the conduit 449 (from the reservoir 136) to the conduit 454 and into the first pressure chamber 440 of the plunger assembly 134 such as during a pressure generating rearward stroke of the piston 406.

Generally, the first and second plunger valves 450 and 452 are controlled to permit fluid flow at the outputs of the plunger assembly 134 and to permit venting to the reservoir 136 through the plunger assembly 134 when so desired. For example, the first plunger valve 450 is preferably energized to its open position during a normal braking event. Additionally, it is preferred that both the first and second plunger valves 450 and 452 remain open (which may reduce noise during operation). Preferably, the first plunger valve 450 is almost always energized during an ignition cycle when the engine is running. Of course, the first and second plunger valves 450 and 452 may be purposely operated to their closed positions such as during a pressure generating rearward stroke of the plunger assembly 134 or during a hill hold brake operation. The first and second plunger valves 450 and 452 are preferably in their open positions when the piston 406 of the plunger assembly 134 is operated in its forward stroke to maximize flow. When the driver releases the brake pedal 190, the first and second plunger valves 450 and 452 preferably remain in their open positions. However, under certain circumstances, such as during slip control and the driver is pushing hard on the brake pedal 190 during controlled low pressures and then the driver releases half way on the brake pedal 190, it may be desirable to operate the first and second plunger valves 450 and 452 to their closed positions. Note that fluid can flow through the check valve within the closed second plunger valve 452, as well as through the check valve 451 from the reservoir 136 depending on the travel direction of the piston 406 of the plunger assembly 134 and the state of the first and second plunger valves 450 and 452.

It may be desirable to configure the first plunger valve 450 with a relatively large orifice therethrough when in its open position. A relatively large orifice of the first plunger valve 450 helps to provide an easy flow path therethrough. The second plunger valve 452 may be provided with a much smaller orifice in its open position as compared to the first plunger valve 450. One reason for this is to help prevent the piston 406 of the plunger assembly 134 from rapidly being back driven upon a failed event due to the rushing of fluid through the first output conduit 454 into the first pressure chamber 440 of the plunger assembly 134, thereby preventing damage to the plunger assembly 134. As fluid is restricted in its flow through the relatively small orifice, dissipation will occur as some of the energy is transferred into heat. Thus, the orifice should be of a sufficiently small size so as to help prevent a sudden catastrophic back drive of the piston 406 of the plunger assembly 134 upon failure of the brake system 100, such as for example, when power is interrupted or lost to the motor 414 and the pressure within the output conduit 154 is relatively high. The plunger assembly 134 may include an optional spring member, such as a spring washer 419, to assist in cushioning such a rapid rearward back drive of the piston 406. The spring washer 419 may also assist in cushioning the piston 406 moving at any such speed as it approaches a rest position near its most retracted position within the bore 400. It is noted that although the isolation valves 150 and 152 could shuttle to their positions shown in FIG. 2 during a power failure, the presence of the spring washer 419 enables the isolation valves 150 and 152 to be made cheaply with a smaller solenoid wherein they might hydraulically lock and not shuttle, thereby allowing this rapid rearward back drive of the piston 406. The spring washer 419 can also function as a parking element such that the piston 406 can lightly hit its spring washer 419 on a return stroke to determine its homing, start or at rest position. When it is detected that the piston 406 has stopped moving by hitting the spring washer 419, the homing position can be determined.

The first and second plunger valves 450 and 452 provide for an open parallel path between the pressure chambers 440 and 442 of the plunger assembly 134 during a normal braking operation (with the first plunger valve 450 energized). Although a single open path may be sufficient, the advantage of having both the first and second plunger valves 450 and 452 is that the first plunger valve 450 may provide for an easy flow path through the relatively large orifice thereof, while the second plunger valve 452 may provide for a restricted orifice path during certain failed conditions (when the first plunger valve 450 is de-energized to its closed position). It is noted that a single normally open valve with a relatively large orifice could be sufficient instead of the two plunger valves 450 and 452, however, the single valve may need a relatively large solenoid and during power losses the single valve could close causing possible locking of the isolation valves 150 and 152.

The operation of the brake system 100 will now be described. It is noted that the terms "normal braking" or "normal brake apply" generally refers to a braking event in which all of the components of the brake system 100 are functioning normally. Additionally, under a normal braking event, the brake system 100 is not experiencing any detrimental leakage that could hinder proper operation of the brake system 100. FIGS. 2 and 3 illustrates the brake system 100 and the brake pedal unit 130 in their rest positions. In this condition, the driver is not depressing the brake pedal 190. In a non-autonomous braking event, the brake pedal 190 is depressed by the driver of the vehicle indicating their intent in actuating the brake system 100 to decelerate the vehicle. The ECU 140 detects this braking event by signals from the travel sensors 340 and also by the pressure sensor 330.

During a normal brake apply braking operation, the flow of pressurized fluid from the brake pedal unit 130 generated by depression of the brake pedal 190 is diverted into the pedal simulator 132. The simulation valve 246 is actuated or energized to divert fluid through the simulation valve 246 from the input chamber 210 of the brake pedal unit 130 as the input piston 202 is moved via the brake pedal 190. Note that fluid flow from the input chamber 210 to the reservoir 136 is closed off once the passageway 224 in the input piston 202 moves past the lip seal 220. As the input piston 202 generates fluid pressure within the input chamber 210, the pressurized fluid is diverted into the pressure chamber 235 of the pedal simulator 132. The build-up of pressure within the pressure chamber 235 of the pedal simulator 132 moves the piston 232 against the bias of the springs 236 and 238. Compression of the springs 236 and 238 provides a force feedback to the driver of vehicle as the driver feels the resistance on the driver's foot via the brake pedal 190.

During the duration of the normal braking apply, the simulation valve 246 remains open, preferably, in its energized state. Preferably, the simulation valve 246 is energized throughout the duration of an ignition cycle. Also during the normal boost apply braking operation, the isolation valves 150 and 152 are energized to secondary positions to prevent the flow of fluid from the conduits 156 and 158 through the isolation valves 150 and 152, respectively. In one embodiment, the isolation valves 150 and 152 are energized throughout the duration of an ignition cycle such as when the engine is running instead of being energized on and off. This constant energizing helps to minimize noise.

Figure 1:
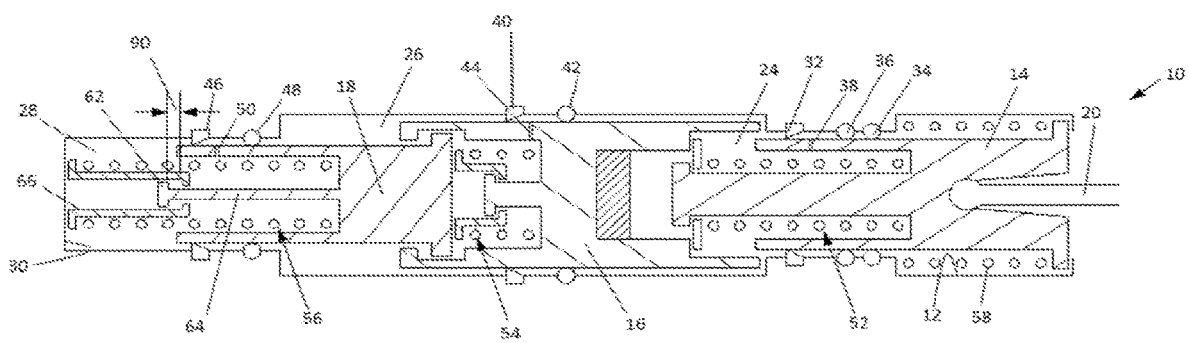
FIG. 1 is a schematic illustration of a prior art brake pedal unit.

Note that the primary and secondary pistons 204 and 206 are not in fluid communication with the reservoir 136 due to their passageways 254 and 264, respectively, being positioned past the lip seals 250 and 260 (unlike the prior art brake pedal unit 10 shown in FIG. 1). Prevention of fluid flow through the isolation valves 152 and 150 hydraulically locks the primary and secondary chambers 212 and 214 preventing further movement of the primary and secondary pistons 204 and 206. Thus, required further initial movement of the brake pedal 190 is not necessary to close of these chambers, as is required in the prior art brake pedal 10.

It is generally desirable to maintain the isolation valves 150 and 152 energized during the normal braking mode to ensure any necessary venting of fluid to the reservoir 136 through the plunger assembly 134. As shown in FIG. 5, the piston 406 of the plunger assembly 134 includes the passageway 444 formed therein to permit this ventilation. However, during a failed condition in which the isolation valves 150 and 152 are not able to be energized (such as an electrical failure or failure of the ECU 140), fluid from the wheel brakes 120*a*, 120*b*, 120*c*, and 120*d* can still be vented via the conduits 156 and 158 and through the brake pedal unit 134 if the pressure within the secondary and primary chambers 214 and 212 exceeds a predetermined pressure level. In one embodiment, the predetermined pressure level is about 0.65 bars, which is sufficient to move the primary and secondary pistons 204 and 206 in the right-hand direction such that the passageways 254 and 264 are to the right of the lip seals 250 and 260, respectively. In this position, fluid can flow from the primary and secondary chambers 212 and 214 into the reservoir 136 via the conduits 265 and 266, respectively. The requirement of exceeding the predetermined pressure level, e.g. 0.65 bar, is generally only required during certain failed conditions. During a failed condition wherein the driver is not applying pressure to the brake pedal 190, this slight pressure (about 0.65 bar for example) may cause a slight braking at one or more of the wheel brakes 120*a*, 120*b*, 120*c*, and 120*d* until a volume increase in the brake fluid due to heating thereof may offset the pressure increase, thereby moving the primary and secondary pistons 204 and 206 to a position to permit venting through the brake pedal unit 130. It has been found that this minor brake application and heating will not cause undue brake fade problems at the wheel brakes.

During a normal brake apply while the pedal simulator 132 is being actuated by depression of the brake pedal 190, the ECU 140 operates the brake system 100 to provide actuation of the wheel brakes 120*a*, 120*b*, 120*c*, and 120*d*. The ECU 140 actuates and regulates the plunger assembly 134 to provide pressure for the wheel brakes 120*a*, 120*b*, 120*c*, and 120*d* based on the information from the travel sensors 340 which corresponds to the driver's intent. The plunger assembly 134 is operated to provide desired pressure levels to the wheel brakes 120*a*, 120*b*, 120*c*, and 120*d* in relation to the driver's intent. The ECU 140 may also use information from the pressure sensor 332 generally located at the output of the plunger assembly 134 to regulate the motor 414 of the plunger assembly 134 to obtain a desired pressure level within the output conduit 54.

To operate the plunger assembly 134, the ECU 140 actuates the motor 414 to rotate the screw shaft 416 in a first rotational direction. Rotation of the screw shaft 416 in the first rotational direction causes the piston 406 to advance in the forward direction (leftward as viewing FIGS. 2 and 5). Movement of the piston 406 causes a pressure increase in the first pressure chamber 440 and fluid to flow out of the first pressure chamber 440 and into the conduit 454. Fluid can flow into the output conduit 154 via the open first and second plunger valves 450 and 452. Note that fluid is permitted to flow into the second pressure chamber 442 via the conduit 443 as the piston 406 advances in the forward direction.

Pressurized fluid from the output conduit 154 is directed into the conduits 160 and 162 through the isolation valves 150 and 152, respectively. The pressurized fluid from the conduits 160 and 162 can be directed to the wheel brakes 120*a*, 120*b*, 120*c*, and 120*d* through open apply valves 170, 174, 178, and 182 while the dump valves 172, 176, 180, and 184 remain closed. It is noted that the first plunger valve 450 is energized to its open position during a normal braking event so that both of the first and second plunger valves 450 and 452 are open. The plunger valve 450 may be energized throughout the duration of an ignition cycle.

When the driver lifts off or releases the brake pedal 190, the ECU 140 can operate the motor 414 to rotate the screw shaft 416 in the second rotational direction causing the piston 406 to retract withdrawing the fluid from the wheel brakes 120*a*, 120*b*, 120*c*, and 120*d*. The speed and distance of the retraction of the piston 406 is based on the demands of the driver releasing the brake pedal 190 with the cooperation from the sensor 418. Of course, if the driver rapidly releases the brake pedal 190, the plunger assembly 134 may be operated to avoid such an instant drop in pressure. Under certain conditions, such as in a non-boosted slip control event, the pressurized fluid from the wheel brakes 120*a*, 120*b*, 120*c*, and 120*d* may assist in back-driving the ball screw mechanism 412 moving the piston 406 back towards its rest position. Note that when the driver releases the brake pedal 190, the first and second plunger valves 450 and 452 preferably remain in their open positions during a non-slip control event.

During a braking event, the ECU 140 can also selectively actuate the apply valves 170, 174, 178, and 182 and the dump valves 172, 176, 180, and 184, respectively, to provide a desired pressure level to the wheel brakes 120*a*, 120*b*, 120*c*, and 120*d*. This selective actuation of the wheel brakes 120*a*, 120*b*, 120*c*, and 120*d* may even be in conflict of the driver's intent as sensed by the travel sensors 340. For example, the ECU 140 can control the brake system 100 during ABS, DRP, TC, VSC, regenerative braking, and/or autonomous braking events by general operation of the plunger assembly 134 in conjunction with selective actuation the apply valves 170, 174, 178, and 182 and the dump valves 172, 176, 180, and 184. Under certain driving conditions, the ECU 140 communicates with a powertrain control module (not shown) and other additional braking controllers of the vehicle to provide coordinated braking during these advanced braking control schemes (e.g., anti-lock braking (AB), traction control (TC), vehicle stability control (VSC), and regenerative brake blending, amongst others).

In some situations such as a relatively large brake pressure demand or extended slip control event, the piston 406 of the plunger assembly 134 may reach its full stroke length within the bore 400 of the housing and additional boosted pressure is still desired to be delivered to the wheel brakes 120*a*, 120*b*, 120*c*, and 120*d*. The plunger assembly 134 is a dual acting plunger assembly such that it is configured to also provide boosted pressure to the output conduit 154 when the piston 406 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 406 has reached its full stroke, for example, and additional boosted pressure is still desired, the second plunger valve 452 is energized to its closed check valve position. The first plunger valve 450 is de-energized to its closed position. The ECU 140 actuates the motor 414 in a second rotational direction opposite the first rotational direction to rotate the screw shaft 416 in the second rotational direction. Rotation of the screw shaft 416 in the second rotational direction causes the piston 406 to retract or move in the rearward direction (rightward as viewing FIGS. 2 and 5). Movement of the piston 406 causes a pressure increase in the second pressure chamber 442 and fluid to flow out of the second pressure chamber 442 and into the conduit 443 and the output conduit 154. Pressurized fluid from the output conduit 154 is directed into the conduits 160 and 162 through the isolation valves 150 and 152. The pressurized fluid from the conduits 160 and 162 can be directed to the wheel brakes 120*a*, 120*b*, 120*c*, and 120*d* through the opened apply valves 170, 174, 178, and 182 while dump valves 172, 176, 180, andl 84 remain closed.

In a similar manner as during a forward stroke of the piston 406, the ECU 140 can also selectively actuate the apply valves 170, 174, 178, and 182 and the dump valves 172, 176, 180, and 184 to provide a desired pressure level to the wheel brakes 120*a*, 120*b*, 120*c*, and 120*d*, respectively. When the driver completely lifts off or releases the brake pedal 190 during a pressurized rearward stroke of the plunger assembly 134, the first and second plunger valves 450 and 452 are preferably operated to their open positions, as discussed above, although having only one of the valves 450 and 452 open would generally still be sufficient. Note that when transitioning out of a slip control event, the ideal situation would be to have the position of the piston 406 and the displaced volume within the plunger assembly 134 correlate just about exactly with the given pressures and fluid volumes within the wheel brakes 120*a*, 120*b*, 120*c*, and 120*d*. However, when the correlation is not exact, fluid can be drawn from the reservoir 136 via the check valve 451 into the chamber 440 of the plunger assembly 134. To vent the plunger assembly 134, fluid may flow through the port 448 to the reservoir 136.

In the event of a loss of electrical power to portions of the brake system 100 provides for a manual push-through or manual apply such that the brake pedal unit 130, which is operated by the driver via the brake pedal 190, can supply relatively high pressure fluid to the primary output conduit 158 and the secondary output conduit 156. Thus, the terms "manual push-through" or "a manual push-through event or mode" refers to the situation in which the brake pedal 190 is being depressed for actuation of the brake pedal unit 130, and at least a portion of the brake system 100 is not operating properly or a detrimental leak has occurred within the brake system 100. Note that during a manual push-through event, the pedal simulator 132 is not being utilized as normally intended.

During an electrical failure, the motor 2414 of the plunger assembly 134 might cease to operate, thereby failing to produce pressurized hydraulic brake fluid from the plunger assembly 134 to the output conduit 154. During the electrical failure, the ECU 140 may also be inoperable and may be unable to actuate the plunger assembly 134 or the solenoid valves of the brake system 100. In this situation, the isolation valves 150 and 152 will shuttle (or remain) in their de-energized positions to permit fluid flow from the conduits 156 and 158 to the wheel brakes 120*a*, 120*b*, 120*c*, and 120*d*. The pedal simulator valve 246 will shuttle (or remain) to its de-energized closed position to prevent fluid from flowing out of the input chamber 210 to the pedal simulator 132. The closing of the conduit 218 to the pedal simulator 132 will assist in causing the input chamber 210 to be hydraulically locked. During the manual push-through apply, when the driver continues to push on the brake pedal 190, the input piston 202, the primary piston 204, and the secondary piston 206 will advance leftwardly, as viewing FIGS. 2 and 3. This advancement will cause the passageway 224 to move past the seal 220 to prevent fluid flow from the fluid chambers 210 to the reservoir 136. Fluid flows from the primary and the secondary chambers 212 and 214 into the conduits 158 and 156, respectively, to actuate the wheel brakes 120*a*, 120*b*, 120*c*, and 120*d*.

Referring now back to FIG. 3, the brake pedal unit 130 includes various features which have advantages over the prior art brake pedal unit 10 of FIG. 1. One advantage is the lower force requirement to actuate the brake pedal unit 130 as compared to actuation of the brake pedal unit 10. The brake pedal unit 10 includes springs therein having a higher preload force values compared to the brake pedal unit 130. The higher spring preload values are necessary for proper operation of the brake pedal unit 10. It is known that the return spring 58 of the brake pedal unit 10 has a preload force value of about 40 N (newton). The input, primary, and secondary spring assemblies 52, 54, and 56 have preload force values of 100 N, 75 N, and 50 N, respectively. However, for a preferred embodiment of the brake pedal unit 130, the return spring 286 has a preload force value of about 45 N, and the input, primary, and secondary springs 288, 304, and 312 have a preload force value of about 5 N, 80 N, and 55 N, respectively. The preload values generally indicate the required force acting on the spring to initiate the start of deflection of the spring. It should be understood that these values are indicative of just some examples of desired embodiments of the brake pedal unit 130 and are not to be held to limit the invention as disclosed herein. It is also noted that generally each of the seals of the brake pedal units 10 and 130 provide about 7 N of nominal frictional forces that are required to overcome.

Since the primary and secondary pistons 204 and 206 of the brake pedal unit 130 do not need to be moved to a vented position with respect to a cut-off with the reservoir 136, as compared to the brake pedal unit 10, this design enables a lowering in force required by the driver acting on the brake pedal 190 to initiate movement.

Due to stack up tolerances in manufacturing and assembly of the various components of the brake pedal units 10 and 130, it is desirable to design gaps between some components while providing contact or no gaps between other components for proper alignment of the pistons within the bore of the brake pedal units 10 and 130. Providing design aspects for gaps and contacts may also help in determining the preload spring forces within the brake pedal units 10 and 130. For example, eliminating a gap 90 (shown in the brake pedal unit 10 in FIG. 1) from the design of the brake pedal unit 130 assists in assuring alignment of the passageways 254 and 264 of the primary and secondary pistons 204 and 206. Since a gap 90 is eliminated in the brake pedal unit 130, it may be desirable to include the gap 302 (described above) to compensate for any manufacturing tolerances when assembling the components and springs of the brake pedal unit 130 within its housing. In designing the brake pedal unit 130, the desired spring forces and seal frictions are typically first determined, and then the location and spacing of desired gaps may be appropriately calculated. Since the gap 302 is associated with the spring 288 having the lowest preload force (5 N), compression of this spring 288 during initial actuation of the brake pedal unit 130 is advantageously relatively low.

All three pistons (the input piston 14, the primary piston 16, and the secondary piston 18) of the brake pedal unit 10 are generally simultaneously cut off from the reservoir as all three pistons move leftward as viewing FIG. 1. Contrary, only the input piston 202 of the brake pedal unit 130 requires initial movement for cut off from the reservoir 136 *o* occur. The elimination of movement of the primary and secondary pistons 204 and 206 of the brake pedal unit 130 reduces the force required by the driver during initial operation of the brake pedal unit 130 as compared to the brake pedal unit 10.

Another difference between the brake pedal units 130 and 10 is that the brake pedal unit 10 includes a redundant seal 36 adjacent a seal 34. The redundant seal 36 helps to prevent minor fluid leakage occurring out of the brake pedal unit 10 adjacent the input piston 14 and the opening of the bore of the housing. Due to the elimination of a redundant seal from the brake pedal unit 130, a seal interface (not shown) may be utilized at the end of the bore 200 of the housing of the brake pedal unit 130 to trap any fluid that bypasses the seal 222. The seal interface may include an optional sponge (not shown) and covered by a retainer or cover. Although the addition of a redundant seal 36 may assist in helping prevent fluid leakage, the addition of the redundant seal 36 adds seal friction resistance increasing the force necessary to initiate movement of the input piston 14. The addition of the redundant seal 36 also necessitates the addition of additional spring forces to overcome this friction resistance which further increases the force necessary to initiate movement of the input piston 14.

The operation of a generally low braking event comparing the differences between the prior art brake pedal unit 10 and the brake pedal unit 130 as felt by the driver of the vehicle of the brake pedal will now be described. As will be seen from the graph of FIG. 6, the structural and operational differences between the brake pedal units 10 and 130 (as discussed above) generally provide a reduced pedal force for the brake pedal unit 130 compared to the prior art brake pedal unit 10.

Figure 6:
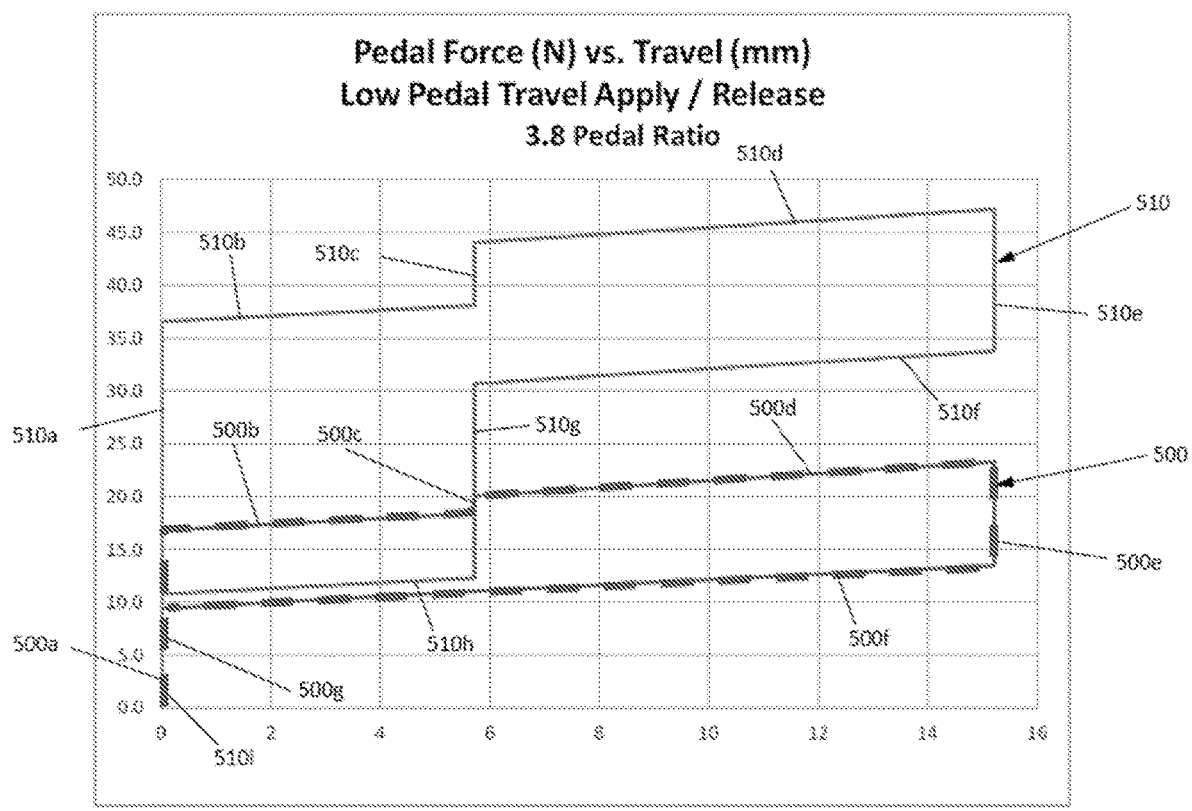
FIG. 6 is a graphical representation of pedal force vs. pedal travel of the brake pedal units of FIGS. 1 and 5 during operation thereof.

FIG. 6 illustrates graphical representations of a low pedal travel apply and release occurrence of a normal braking event for the brake pedal units 10 and 130. More specifically, the graphical representation is of a pedal force vs a pedal travel. The pedal travel corresponds directly with travel of the input pistons 14 and 202 within the brake pedal units 10 and 130, respectively. As described above, movement of the brake pedal 190 causes movement of the respective input piston (14 or 202) via the linkage arm 208 of the brake pedal 190. It is noted that the numerical data for the pedal travel apply and release occurrence represented in FIG. 6 is used in conjunction with a brake pedal having a pedal ratio of about 3.8. The reactionary forces from the input piston provide feedback as experienced by the foot of the driver as the driver operates the brake pedal 190. A dashed line 500 is associated with the operation of the brake pedal unit 130 of FIG. 3 and the pedal simulator 132 of FIG. 4. A solid line 510 is associated with the prior art brake pedal unit 10 of FIG. 1 and a respective pedal simulator, such as one that is similar to the pedal simulator 132. FIG. 6 provides an appropriate graphical representation highlighting the differences between the brake pedal units 10 and 130. However, it should be understood that these values are indicative of just one example of a braking event of the brake pedal units 10 and 130 for descriptive purposes and are not to be held to limit the invention as disclosed herein.

Referring now to the broken or dashed line 500 associated with the brake pedal unit 130, an initial preloaded force input, indicated by a nearly vertical path 500*a*, generally corresponds to the force required to overcome the various preload requirements of the springs within the brake pedal unit 130 as well as overcome various frictional forces imparted by the various seals of the brake pedal unit 130. For the example illustrated in FIG. 6, the force at which these forces are overcome is at about 16.8 N. This is derived by adding the preload spring force of 45 N of the return spring 286, plus the preload spring force of 5 N of the input spring 288, plus the nominal frictional forces of about 7 N each for the seals 220 and 22*s* of the input piston 202, and then dividing by the pedal ratio of about 3.8 to obtain about 16.8 N Once the preload force of about 16.8 N is overcome, the input piston 202 starts to move towards a position such that the passageway 224 moves just past the lip seal 220, as indicated by the sloped path 500*b*. Note that during the path 500*b*, the primary and secondary pistons 204 and 206 are not moving (unlike the brake pedal unit 10). The gradual rise along the path 500*b* generally accounts for the spring rate of the compressing return spring 286 and input spring 288. An assumption can be made with respect to the graphical representations of FIG. 6 that all springs have the same spring rate, such as for example, of about 2 N/m.

Once the passageway 224 of the input piston 202 moves just past the lip seal 220 cutting off fluid communication of the input chamber 210 with the reservoir 136, as indicated at the end of the sloped path 500*b*, a further force is required to overcome the preload forces of the first and second springs 236 and 238 of the pedal simulator 132 and overcome the seal friction of the seals in the pedal simulator 132. This is represented by the nearly vertical path 500*c*. Upon a sufficient further force, generally at about 20 N, the input piston 202 continues to move (compressing the input spring 288 and actuating the pedal simulator 132), as represented by a sloped path 500*d* until the driver halts applying force to the brake pedal 190, as represented by this example in FIG. 6. Note that there is generally no significance to the travel length (about 15 mm) when the driver starts release of the brake pedal 190 and this graphical representation is used only for demonstrative purposes of a relatively low pedal travel apply. During the path 500*d*, the pedal simulator 132 is being actuated and its piston 232 is moving therein compressing the first and second springs 236 and 238. Paths 500*e*, 500*f*, and 500*g* represent the release of the brake pedal 190 by the driver back to an at rest state. The nearly vertical drop of path 500*e* represents the change of direction and associated seal friction change of the input piston 202 and the pedal simulator 132.

Referring now to the solid line 510 associated with the prior art brake pedal unit 10, an initial preloaded force input, indicated by a nearly vertical path 510*a* generally corresponds to the force required to overcome the various preload requirements of the springs within the brake pedal unit 10 as well as overcome various friction forces imparted by the various seals of the brake pedal unit 10. A larger force is required compared to the brake pedal unit 130 due to all three pistons (the input piston 14, the primary piston 16, and the secondary piston 18) now having to be moved until their respective passageways 38, 44, and 50, respectively, are blocked. For the example illustrated in FIG. 6, the force at which these forces are overcome is at about 36.6 N. This is derived by adding the preload spring force of 40 N of the return spring 58, plus the preload spring force of 50 N of the secondary spring 56, plus the nominal frictional forces of about 7 N each for all of the seals 32, 24, 26, 40, 42, 46, and 48, and then dividing by the pedal ratio of about 3.8 to obtain about 36.6 N.

Once the preload force of about 36.6 N is overcome, all three pistons (input piston 14, primary piston 16, and secondary piston 18) start to move towards their respective positions closing off the fluid communication with the reservoir. More specifically, the passageways 38, 44, and 50 move past the lip seals 32, 40, and 46, as indicated by the sloped path 510b. The gradual rise along the path 510b generally accounts for the spring rate of the compressing return spring 58 and the secondary spring 56. The gradual rise along the path 510b is similar to the path 500b.

Once the passageways 38, 44, and 50 move past the lip seals 32, 40, and 46, as indicated at the end of the sloped path 510b, a further force is required to overcome the preload forces of the springs of the pedal simulator 132 and the input spring 288 of the brake pedal unit 130, which is represented by the nearly vertical path 510c. Upon a sufficient further force, generally at about 44 N, the input piston 14 continues to move (compressing the input spring 52 and actuating the pedal simulator), as represented by a sloped path 510d until the driver halts applying force to the brake pedal. During the path 510d, the pedal simulator is being actuated.

Upon release, paths 510e and 510f are similar to paths 500e and 500f until about 5.7 mm when the pedal simulator empties of fluid and all three pistons (the input piston 14, the primary piston 16, and the secondary piston 18) start their movement back to their rest positions, as represented by path 510g. Movement of the three pistons back to their rest positions is indicated by path 510h, and return to a rest state represented by path 510i.

As can be seen from the graph of FIG. 6, the differences between the brake pedal units 10 and 130 generally provide a reduced pedal force requirement for the brake pedal unit 130 compared to the brake pedal unit 10. The input piston spring 52 (100 N preload) of the brake pedal unit 10 has a greater preload value than the input piston spring 288 (5 N preload) of the brake pedal unit 130 since the spring 52 is utilized during the initial movement of the primary and secondary pistons 16 and 18 during simultaneous cut off. With respect to the brake pedal unit 130, the input spring 288 is not utilized to move the primary and secondary pistons 204 and 206. The input spring 288 may provide a much lesser force acting on the primary and secondary pistons 204 and 206 to prevent movements caused by bumps or motion of the vehicle that would add cut off travel in the next brake apply after inadvertent movement of the pistons in the brake pedal unit 130.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake pedal unit connected to a brake pedal and in selective fluid communication with a fluid reservoir, the brake pedal unit comprising:
   a housing defining a bore formed therein;
   an input piston slidably disposed in the bore, wherein the input piston is connected to the brake pedal such that engagement of the brake pedal causes movement of the input piston within the bore of the housing of the brake pedal unit, and wherein the brake pedal unit is defined to be in an at rest position when the brake pedal in not engaged causing movement of the input piston, movement of the input piston pressurizing an input chamber in selective fluid communication with a pedal simulator;
   an input passageway permitting fluid communication between the input chamber and the reservoir when the brake pedal unit is in the rest position;
   a primary piston slidably disposed in the bore for pressurizing a primary chamber;
   a primary passageway permitting fluid communication between the primary chamber and the reservoir, wherein fluid flow through the primary passageway is blocked when the brake pedal unit is in the rest position;
   a secondary piston slidably disposed in the bore for pressurizing a secondary chamber; and
   a secondary passageway permitting fluid communication between the secondary chamber and the reservoir, wherein fluid flow through the secondary passageway is blocked when the brake pedal unit is in the rest position;
   when the brake pedal unit is in the rest position, the fluid communication between the primary chamber and the reservoir is blocked via the blocked primary passageway, the fluid communication between the secondary chamber and the reservoir is blocked via the blocked secondary passageway, and the input chamber and the reservoir are in fluid communication via the input passageway, and
   during a normal manual push through event in which the brake pedal is depressed, the fluid communication between the primary chamber and the reservoir is blocked via the blocked primary passageway, the fluid communication between the secondary chamber and the reservoir is blocked via the blocked secondary passageway, fluid flow through the input passageway is blocked, and the fluid communication between the input chamber and the reservoir is blocked via the blocked input passageway.

2. The unit of claim 1, wherein movement of the input piston by a predetermined length of travel causes blockage of the input passageway, thereby cutting off fluid communication with the pedal simulator.

3. The unit of claim 1, wherein the input chamber is generally defined between input piston and the primary piston, and wherein the secondary chamber is generally defined between the primary piston and the secondary piston.

4. The unit of claim 1, wherein fluid flow through the primary passageway is blocked by a primary seal sealingly engaged between the primary piston and the bore of the housing when the brake pedal unit is in the rest position.

5. The unit of claim 4, wherein the primary seal is a lip seal.

6. The unit of claim 4, wherein the primary seal is mounted within grooves formed in the bore of the housing and is sealingly engaged with an outer wall of the primary piston.

7. The unit of claim 1, wherein fluid flow through the secondary passageway is blocked by a secondary seal sealingly engaged between the secondary piston and the bore of the housing when the brake pedal unit is in the rest position.

8. The unit of claim 7, wherein the secondary seal is a lip seal.

9. The unit of claim 7, wherein the secondary seal is mounted within grooves formed in the bore of the housing and is sealingly engaged with an outer wall of the secondary piston.

10. The unit of claim 1, wherein the primary passageway is formed through the primary piston, and wherein the secondary passageway if formed through the secondary piston.

11. The unit of claim 1, wherein during a normal braking event in which the brake pedal is depressed, movement of the primary and secondary pistons is suppressed.

12. The unit of claim 11, wherein during a manual push through event in which the brake pedal is depressed, movement of the primary and secondary pistons is permitted.

13. The unit of claim 12, wherein after a manual push through event and release of the brake pedal, slight pressure above atmospheric pressure remains in the primary and secondary chambers.

14. The unit of claim 1, wherein the input piston and primary piston are separated from one another by a first caged spring assembly, and wherein the primary piston and the secondary piston are separated from one another by a second caged spring assembly.

15. The unit of claim 14, wherein the first caged spring assembly has a preload force that is less than the preload force of the second spring assembly.

16. The unit of claim 15, wherein the first caged spring assembly is slightly compressed when the brake pedal unit is in the rest position.

17. A brake pedal unit connected to a brake pedal and in selective fluid communication with a fluid reservoir, the brake pedal unit comprising:
a housing defining a bore formed therein;
an input piston slidably disposed in the bore, wherein the input piston is connected to the brake pedal such that engagement of the brake pedal causes movement of the input piston within the bore of the housing of the brake pedal unit, and wherein the brake pedal unit is defined to be in an at rest position when the brake pedal in not engaged causing movement of the input piston;
a primary piston slidably disposed in the bore for pressurizing a primary chamber;
a primary passageway permitting fluid communication between the primary chamber and the reservoir, wherein fluid flow through the primary passageway is blocked when the brake pedal unit is in the rest position;
a secondary piston slidably disposed in the bore for pressurizing a secondary chamber; and
a secondary passageway permitting fluid communication between the secondary chamber and the reservoir, wherein fluid flow through the secondary passageway is blocked when the brake pedal unit is in the rest position;
wherein during a failed condition, pressure in the primary and secondary chambers causes the primary and second passageways to be unblocked, the reservoir being in fluid communication with the primary and secondary chambers via the unblocked primary and secondary passageways.

18. The unit of claim 17, wherein movement of the input piston pressurizes an input chamber in selective fluid communication with a pedal simulator.

19. The unit of claim 18 further including an input passageway permitting fluid communication between the input chamber and the reservoir when the brake pedal unit is in the rest position.

20. The unit of claim 19, wherein movement of the input piston by a predetermined length of travel causes blockage of the input passageway, thereby cutting off fluid communication with the pedal simulator.

21. The unit of claim 17, wherein the input chamber is generally defined between input piston and the primary piston, and wherein the secondary chamber is generally defined between the primary piston and the secondary piston.

22. The unit of claim 17, wherein fluid flow through the primary passageway is blocked by a primary seal sealingly engaged between the primary piston and the bore of the housing when the brake pedal unit is in the rest position.

23. The unit of claim 17, wherein fluid flow through the secondary passageway is blocked by a secondary seal sealingly engaged between the secondary piston and the bore of the housing when the brake pedal unit is in the rest position.

24. The unit of claim 17, wherein the primary passageway is formed through the primary piston, and wherein the secondary passageway if formed through the secondary piston.

25. The unit of claim 17, wherein during a normal braking event in which the brake pedal is depressed, movement of the primary and secondary pistons is suppressed.

26. The unit of claim 25, wherein during a manual push through event in which the brake pedal is depressed, movement of the primary and secondary pistons is permitted.

27. The unit of claim 26, wherein after a manual push through event and release of the brake pedal, slight pressure above atmospheric pressure remains in the primary and secondary chambers.

28. The unit of claim 17, wherein the input piston and primary piston are separated from one another by a first caged spring assembly, and wherein the primary piston and the secondary piston are separated from one another by a second caged spring assembly.

29. The unit of claim 28, wherein the first caged spring assembly has a preload force that is less than the preload force of the second spring assembly.

30. The unit of claim 29, wherein the first caged spring assembly is slightly compressed when the brake pedal unit is in the rest position.

* * * * *